United States Patent [19]

Kullick et al.

[11] Patent Number: 5,732,275

[45] Date of Patent: Mar. 24, 1998

[54] METHOD AND APPARATUS FOR MANAGING AND AUTOMATICALLY UPDATING SOFTWARE PROGRAMS

[75] Inventors: Steven Kullick, Saratoga; Diane Titus, Santa Clara, both of Calif.

[73] Assignee: Apple Computer, Inc., Cupertino, Calif.

[21] Appl. No.: 584,345

[22] Filed: Jan. 11, 1996

[51] Int. Cl.⁶ .................................................. G06F 9/06
[52] U.S. Cl. .................................. 395/712; 395/651
[58] Field of Search ............................. 395/712, 651, 395/652, 653, 701

[56] References Cited

U.S. PATENT DOCUMENTS

| | | | |
|---|---|---|---|
| 4,954,941 | 9/1990 | Redman | 395/712 |
| 5,155,847 | 10/1992 | Kirouac et al. | 395/600 |
| 5,359,730 | 10/1994 | Marron | 395/712 |
| 5,379,429 | 1/1995 | Hirasawa et al. | 395/712 |
| 5,473,772 | 12/1995 | Halliwell et al. | 395/650 |
| 5,586,304 | 12/1996 | Stupek, Jr. et al. | 395/712 |

*Primary Examiner*—Kevin A. Kriess
*Attorney, Agent, or Firm*—Burns, Doane, Swecker & Mathis, L.L.P.

[57] ABSTRACT

A software program running on a computer is automatically managed, monitored and updated with a newer version in a completely automated fashion, without interruption of its primary function, and in a manner that is completely transparent to the user of the computer. This is achieved by means of a control module that performs the functions of locating and identifying other versions of its associated program, determining whether the other versions are older or newer than currently stored versions, and downloading a newer version. Multiple versions of the program can remain accessible on the computer, and the control module manages the launching of a particular version that may be required. Statistical data relating to the launching and operation of the program is collected, and uploaded to a central location on a regular basis.

25 Claims, 3 Drawing Sheets

METHOD AND APPARATUS FOR MANAGING AND AUTOMATICALLY UPDATING SOFTWARE PROGRAMS

FIELD OF THE INVENTION

The present invention is directed to computer systems, and more particularly to a method and apparatus for automatically updating and managing software programs that reside on computers, such as client computers in networked systems.

BACKGROUND OF THE INVENTION

One of the primary factors that contributes to the value of a computer is its ability to perform a wide range of useful, often unrelated, functions. Each of these functions requires the installation of a set of software instructions, commonly referred to as a program, onto a storage device of the computer before the desired function can be performed. Over time, modifications are typically made to the instructions in a program, for example to correct mistakes in the program, to modify its features, or to accommodate changes made to the hardware and/or operating system of the computer. Each time an updated version of a program with a revised set of modifications is made available for use, it is typically labeled with a unique identifier, such as a new version number. Each computer user who receives an updated version of a program has the responsibility to see that it is properly installed and configured on all computers where it is to be used. Often, the user is required to ascertain for himself or herself that a new version of a program of interest exists, and thereafter obtain a copy of the new version. In situations where a large number of copies of the program are required to be updated, such as in a network environment, the task of updating all copies of the program can prove to be both cumbersome and time consuming.

In the past, efforts have been made to automate the process of upgrading software programs as new versions become available. For example, in a network environment, it is possible to send an electronic mail message to all users on the network that a new version of a program is available. In this case, however, the individual users are required to download and install the new software themselves, when and if the upgrade is desired. For those users who are not familiar with the procedures necessary to retrieve and/or install the software, the installation may end up being faulty, inadequate or delinquent. In such situations, support from a network administrator or the like may be required. This can be particularly difficult in an organization where a small number of personnel are required to provide support to a large number of users. Consequently, uniform and timely software upgrades in an organization of any appreciable size can be difficult or impossible to achieve.

In an effort to reduce administrative overhead and maintain version consistency, automated upgrade mechanisms have been developed. These systems are limited to network-based independent programs that attempt to affect changes to software modules that are identified by a network administrator, based on a set of rules. To be effective, these approaches require significant maintenance of the rule set by the administrator, adding complexity and overhead to the process. In addition, since these operations are external to the software being updated, they require interruption of the operation of the software before the updating can take place. The user often has no control over the time when an update occurs. Furthermore, since these mechanisms exert external control, security issues are raised. For example, an active operation that has access to a large number of computers, such as an external updating program, provides a path via which a virus or a hacker can invade the computer system.

Accordingly, it is desirable to provide a mechanism by which software programs can be automatically updated in an easy and effective manner without concerns over security issues that are raised by external access requirements.

Typically, when a software program is updated, there is no need to keep previous, older versions of the program, and so they can simply be deleted. In some cases, however, it may be desirable to have access to multiple versions of the program. For example, if documents were created with an older version of an application program, the user may desire to use the older version when working on those documents, rather than convert them to the format of the newer version. This may be particularly true when the documents are to be shared with other users who may not have the newest version of the application.

It is further desirable, therefore, to provide a mechanism which manages the use of an application program when multiple versions are present, as well as provide feedback information that can be employed as an audit tool and to provide useful data to program developers. Preferably, this management function is carried out through the same mechanism that provides the automatic update capabilities.

BRIEF STATEMENT OF THE INVENTION

In accordance with the present invention, these objectives are achieved by means of a method and apparatus that provide for automatic management of multiple resident versions of a software program. The method and apparatus also permit a software program running on a computer to be automatically updated with a newer version in a completely automated fashion, without requiring external access to the computer, and in a manner that is completely transparent to the user of the computer. These results are achieved by means of a control module that is activated when a program is to be launched. The control module performs the functions of locating and identifying other versions of the program of interest, determining whether the other versions are newer than currently stored versions, and downloading a newer version. As part of this operation, the control module can copy the newer version to a specified location, and remove older versions that have been replaced by the newer version and copy missing files that may be needed for a resident version. If desired, both the older and newer versions can remain resident on the computer, in which case the control module manages which one is to be launched in a particular situation. As a further feature, the control module can gather and report desirable operating information such as statistical use data, to a central facility.

Further features of the invention, and the advantages offered thereby, are explained in greater detail hereinafter with reference to specific embodiments illustrated in the accompanying drawings.

DETAILED DESCRIPTION

To facilitate an understanding of the principles and features of the present invention, it is explained hereinafter with reference to its implementation in an illustrative embodiment. In particular, the invention is described in the context of one type of networked computer system. It will be appreciated, however, that this is not the only embodiment in which the invention can be implemented. Rather, it can find utility in a variety of computer configurations, as will become apparent from an understanding of the principles which underlie the invention.

Figure 1:
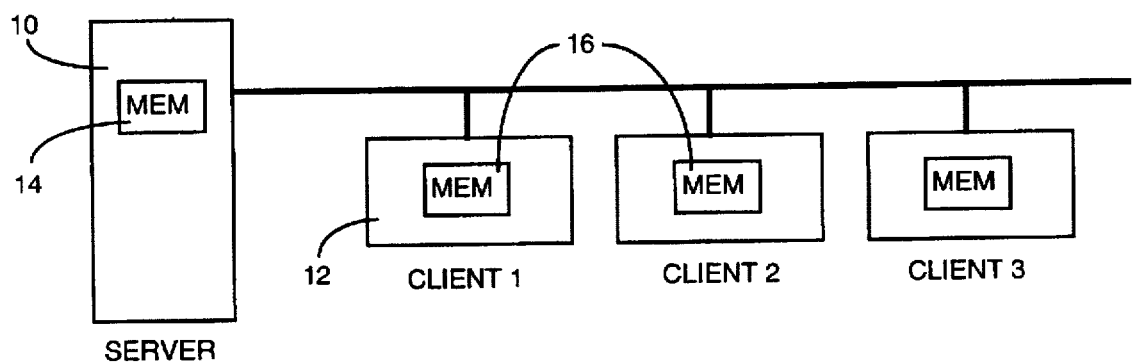
FIG. 1 is block diagram of a computer network.

An example of a computer network of the type in which the present invention might be implemented is illustrated in block diagram form in FIG. 1. The structure and arrangement of the computers in which the invention is embodied, as well as the overall architecture of the network, do not form part of the invention itself. Rather, they are briefly described herein to facilitate an understanding of the manner in which the invention cooperates with various components of such a computer system.

Referring to FIG. 1, a typical computer network might comprise at least one server computer 10 that is connected to a number of client computers 12 via a suitable transmission medium, such as coaxial cable, telephone wire, wireless rf links, or the like. Communications between the server 10 and each of the various client computers 12 takes place by means of an established network communication mechanism such as Ethernet, for example. Among other resources that it provides, the server 10 includes a shared memory area 14, which might comprise a predetermined sector or directory on a hard disk drive or other form of nonvolatile memory. Each of the client computers 12 has access to the shared memory area, as a result of which they can read information stored therein, and download it to their respective local memories 16. Depending upon the particular configuration of the network, some or all of the client computers 12 may also have the ability to write information to the shared memory area 14, or a designated portion thereof.

The local memories 16 of the respective client computers store the various software programs that run on the computers. These stored programs might include an operating system, which controls the basic operations of the computer, as well as one or more application programs that users employ to perform desired tasks, such as word processing, drawing, painting, communications, and the like. Over time, each of these various types of programs may be rewritten by their developers to provide additional functionality, correct errors, and/or accommodate new equipment that has become available to the user. When this occurs, the users must upgrade the software programs, i.e. download the newer versions to their computers' memories, to avail themselves of the new features.

In accordance with one aspect of the present invention, the upgrading of programs stored in the memories of the client computers is carried out automatically in a manner that is transparent to the users of the computers and without interruption to the normal operation of the programs. Generally, this result is achieved by storing upgrade versions of the programs in the shared memory area 14 of the server computer 10. Whenever a program, e.g. an application, is to be launched or started on any of the client computers, a software management program associated with the application to be launched is first executed, and determines whether multiple versions of the application are resident. If so, it selects and launches the optimum version of the application for the task at hand, in accordance with user-selected criteria. After the selected version of the application is running, the management program checks the shared memory area 14 to determine whether an upgrade version is present, and if so whether that version is more recent than the newest version of the application stored in the local memory 16. If so, the management program downloads a copy of the most recent version to the memory 16 of the client computer. This procedure takes place in the background, i.e. during idle CPU cycles while the application is running, and therefore does not interrupt the normal operation of the application. Furthermore, it is transparent to the user. Of particular significance, control of the updating procedure takes place from within the client computer itself, so that no external mechanisms are required to implement the automatic updating function.

It may be the case that the user needs to launch the most recent version of an application which has not yet been installed on the local computer. For example, if the user receives a document that was created with the newest version of the application, he or she may attempt to open the document directly, for example by double-clicking a mouse button while a cursor is positioned over an icon for the document. In the past, when this occurred, the user was presented with an error message, which notified the user that the application program necessary to open the document, i.e. the newest version, could not be found. In the context of the present invention, however, the software management program can attempt to locate the newest version, for example in the shared memory area 14, download it to the client computer and then launch it, to permit the document to be automatically opened rather than present the user with a failure message.

Further along these lines, whenever a resident version of an application program is to be launched, the software management program can check to determine whether all files that are critical to the operation of that version are present. Information that identifies which files are critical is typically provided by the application program developer, for example as an early part of the launch routine. Upon selecting a version to launch, the software management program looks for all of the critical files. In some situation, one or more may be missing, for example if the user renames, moves or deletes a file. In such a case, the software management program can conduct a search to determine whether the missing file can be located. The scope of the search can be determined by user-selected criteria. For example, the user can set a preference item which indicates that local memories should be searched first, to determine whether the required file had been renamed or moved. If so, it can be given its original name and/or moved back to the proper location. Alternatively, or as a subsequent step, the user can designate that other memories which are accessible, e.g. via a network, be searched for the needed files. If found, they can be copied to the local memory 16.

Figure 2:
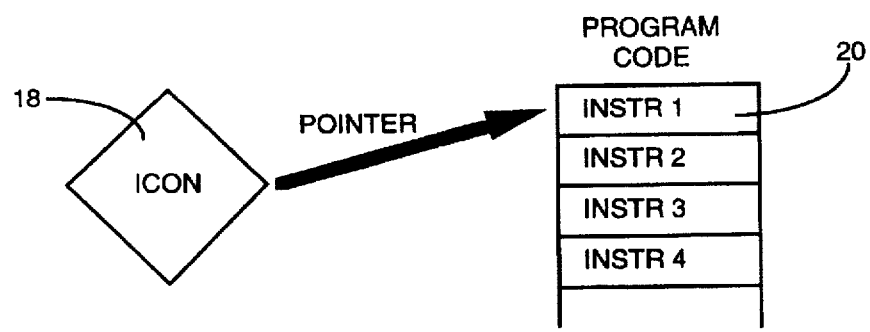
FIG. 2 is a schematic illustration of a prior art procedure for launching a program.

Typically, in computers which employ a graphical user interface, application programs are launched by selecting an icon associated with the program and then performing a specified action, such as double clicking a cursor control button while a cursor is located over the icon. In computers which do not employ a graphical user interface, the application program is typically launched by typing a specified command associated with the application. In response to these types of actions, the computer's operating system locates the designated application program and begins to execute its code, starting with a particular instruction. For example, as depicted in FIG. 2, when the cursor is double clicked on an icon 18 associated with an application program, the operating system is provided a pointer associated with the icon. That pointer identifies the location in memory of the first instruction 20 in the program code to be executed.

Figure 3:
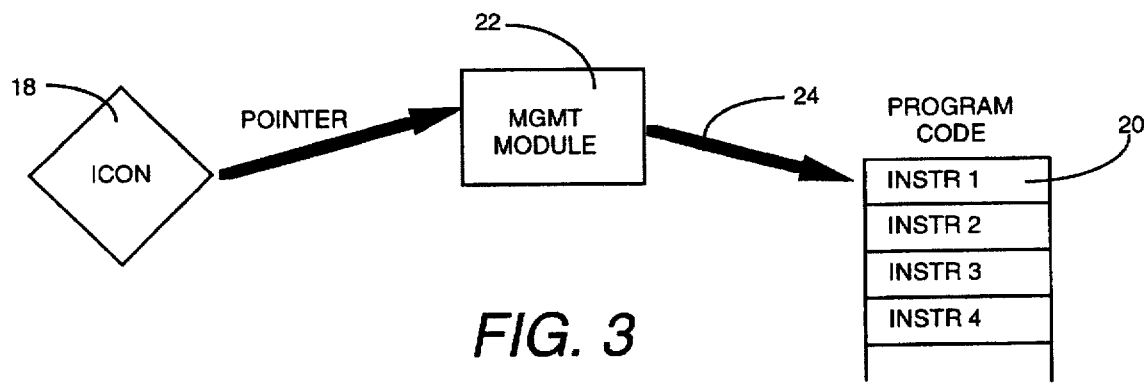
FIG. 3 is a schematic illustration of a procedure for launching a program in accordance with the present invention.

In accordance with the present invention, a control module, or software management program, is logically associated with an application program. Referring to FIG. 3, when an icon 18 associated with the program is double clicked, the operating system is not provided a pointer which identifies the location of the first instruction 20 in the application program itself. Rather, the pointer causes the operating system to first access a software management program 22. This program contains another pointer 24 which identifies the location of the application program instructions to be executed.

Figure 4:
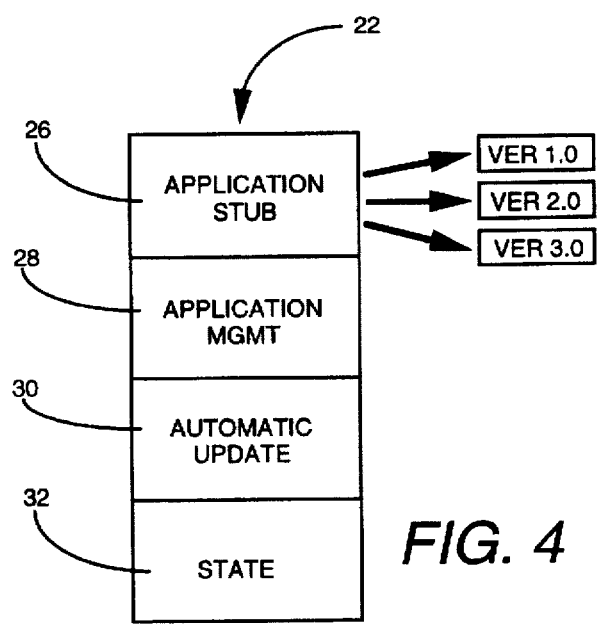
FIG. 4 is a block diagram of the components of the application management program.

It may be the case that multiple versions of an application program are stored in the local memory of the computer. In such a case, the software management program 22 contains a pointer to each of the stored versions, as depicted in FIG. 4. Based upon a defined rule set, an application stub 26 selects the particular version to be launched, and provides the operating system with the pointer to that version. For example, the rule set might specify that the most current version of the application program that is resident on the computer is to be launched, unless the user has selected a document which was created with an older version. In that case, the older version can be launched, if it is still resident within the computer's memory.

In addition to selecting the particular resident version of the application program to be launched, the software management program 22 performs other functions associated with the application program. One level of functionality resides in an application management module 28. This module maintains the list of data files and sub-programs that are associated with each resident version of the application program. The application management module 28 may also contain a dynamic list of the pointers to all available versions of the application, which is utilized by the application stub 26 to launch the appropriate version. If a particular data file or sub-program is required, the application management module 28 contains the information which instructs the computer whether to search local storage and/or selected remote locations, for example other memories accessible via the network, for any missing files.

Figure 5:
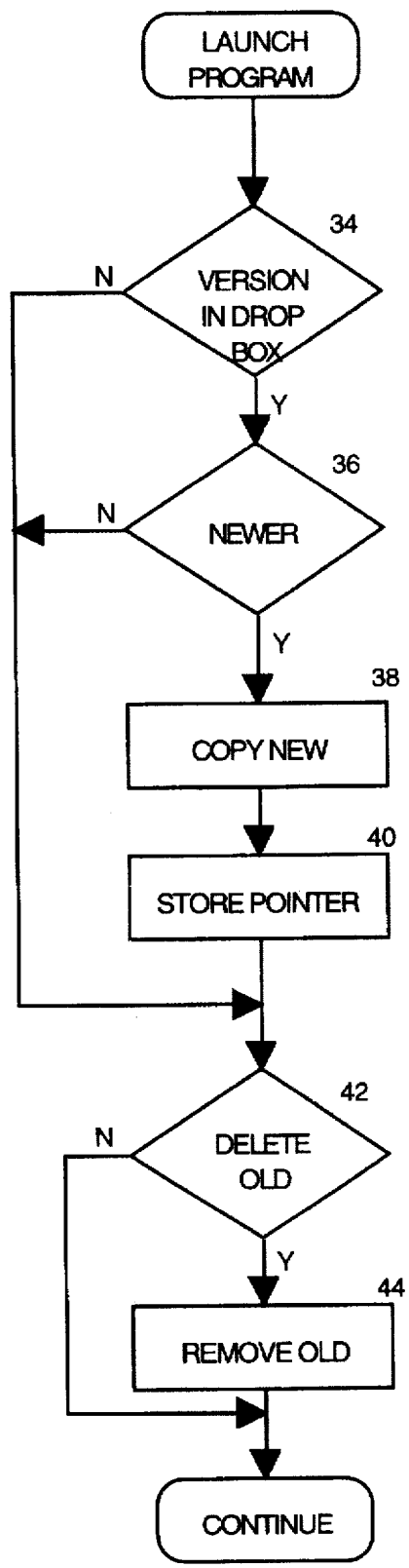
FIG. 5 is a flowchart of the process carried out during the automatic update routine.

The application management program 22 also includes an automatic update subroutine 30. Once the selected version of the application program has been launched, this subroutine runs in the background, i.e. when idle CPU cycles occur during the execution of the application program, to automatically perform updates of the program. The procedure followed by this subroutine is illustrated in FIG. 5. Referring thereto, after the application program has been launched, at Step 34 the subroutine checks whether a version of the program is currently stored in a designated portion of the server'memory 14, designated a drop box. This program might be stored in the drop box of the server by a system administrator, or the like, whenever an upgraded version of the program becomes available. If there is a version of the program stored in the drop box, the subroutine proceeds to step 36, where it determines whether the version stored in the drop box is newer than the most recent version stored in the client computer'memory 16. This determination can be made through any suitable technique. For example, each new version of a program is typically labelled with a successively higher version number than the previous version. Thus, at step 36, the version number of the most recent resident version can be compared with the version number of the program stored in the drop box, to determine which is higher, and therefore newer. Alternatively, or in addition, each version might have a date and time stamp associated with it, from which the newest version can be readily determined.

If a determination is made at step 36 that the version stored in the drop box is newer than the most recent version on the client computer, the new version is copied to the memory 16 of the client computer, at step 38. Once the new version has been copied into the memory, a pointer which identifies the memory location of the starting instruction for the new version is stored in the dynamic list maintained in the application management module 28, at Step 40.

After the copying of the new version has been completed, a determination is made whether any older versions of the application program should be deleted. This determination is also made if there was no version of the application program stored in the drop box, as detected at step 34, or if the version is not newer than the most recent version on the computer, as detected at step 36. The decision whether to delete an older version of the application is based upon preference information provided by the user. A number of alternative criteria can be used for this decision. For example, the user may designate a fixed maximum number of versions to keep, e.g. the three newest versions. Alternatively, or in addition, a decision to delete an older version can be based upon available disk space. For example, the user may designate that the oldest copy is to be deleted if the available disk space is less than ten percent of total capacity. As another criterion, the age of the version can be used. For example, the user may designate that any version which is more than two years old is to be deleted, as long as a newer version exists. As a further criterion, the decision to remove an older version can be based on whether any documents created with the older version exist on the user's current storage devices. If there are no such documents, and a newer version is present, the older version can be deleted.

If any of the criteria for deleting an older version of the application is met, it is deleted at Step 44. If the version to be deleted is the one which is currently running, i.e. the newly downloaded version is to replace the current version, the procedure for doing so is preferably carried out in the manner disclosed in copending application Ser. No. 08/471, 659, filed Jun. 6, 1995, the disclosure of which is incorporated herein by reference.

To keep track of operations that are being performed, a state module 32 is contained within the application software management program. For example, if a new version of an application is being downloaded, the state module keeps track of the particular file that is currently being downloaded, as well as those which have been successfully copied. In the event that the downloading operation is interrupted before the new version has been completely copied, the state module identifies that portion of the function which remains to be completed the next time the application management program 22 is running.

Another function that can be performed by the software management module 22 relates to licensing audits and statistics collection. Each time that an application program is run, the module can keep track of that fact, e.g. the date and time the program was launched, as well as any other information which may be appropriate to monitor. For example, it may be desirable to keep track of which version was launched, which features of a program are used most often, and faults that are encountered. When the software management module 22 checks whether a newer version of the application program is stored at the server 10, it can upload the recorded data relating to the execution of the program. This data might be stored in a designated portion of the shared memory 14, or at some other location which functions as a drop box. The uploaded information from all of the client computers relating to a given application program can be tabulated on a periodic basis at the server, and reported to a network administrator, or the like, to ensure compliance with license restrictions and obtain other useful data regarding the program.

This statistical gathering function can be implemented within the application management module 28, and carried out in conjunction with the automatic update subroutine 30.

Preferably, each application program that is stored in the memory 16 of the client computer has an associated software management program, of the type depicted at 22 in FIG. 4. The software management programs can be separate from the application programs themselves, but logically associated with them. As such, the existence and operation of the management program is transparent to the application program, as well as the user. If desired, however, the software management program can be incorporated within the code of the application program, for example as part of its startup routine.

Since each software management program is logically associated with another program, the management program can be shut down at the same time that the other program is exited. This need not be the case, however, particularly if the management program has not yet completed a task, such as downloading a newer version of the application program or uploading statistical data. If desired, the management program can continue to run after its associated application program has been shut down. The determination whether to keep the management program running can be based on a user selected parameter, such as the amount of available working memory, e.g. RAM, or the number of application programs that are running.

As discussed, the user can customize the operation of the software management program by designating the various criteria for determining how many different versions of a particular application program to keep, and the parameters for determining whether to keep the management program running. In addition, the user can set other performance parameters for the application management function. Some of these user specified parameters can include how often to check for a new version, whether to search local storage media for existing files, whether to search local storage media first for required and/or optional files at program startup, whether to launch a version that created a selected document, or a newer version that has update capability for that version of a document, and whether to automatically search remote locations if a valid working version of the application cannot be found on the local storage media.

From the foregoing, it can be seen that the present invention provides a practical and comprehensive general solution to the area of application management, including automatic update capability, by providing a single mechanism for obtaining, launching and updating applications. In essence, the software management program functions as a complete application management facility. In addition to handling automatic updates of new releases of an application, the program automatically and transparently manages multiple versions of applications, as well as all peripheral data files used by the application. The application management program constitutes a single point of access that, when executed, dynamically determines which version of an application should be loaded into memory and run. Different versions of the application are maintained separately, along with any other application specific files. After initial installation of the management program, no further installations or deletions of application programs by the end user are necessary.

The automatic upgrading of programs is carried out by means of software logic that resides within the client computers themselves, thereby eliminating the need for any external code or other mechanisms. Each program update takes place according to a fixed set of rules and limits, and therefore security concerns are greatly reduced, if not eliminated altogether. In addition, the need for system administration overhead is significantly minimized.

It will be appreciated by those of ordinary skill in the art that the present invention can be embodied in other specific forms without departing from the spirit or essential characteristics thereof. For example, the invention has been described in the context of a networked computer system, in which the new version of a program is downloaded from the central, shared memory and statistical data is uploaded after a current version is launched. The particular time at which the download and upload operations take place is not critical, however. For example, they can be carried out when the user quits the current program, rather than during its execution.

Furthermore, the operation of the invention has been described in the context of managing application programs. However, the practical uses of the invention are not limited to this particular embodiment. Rather, it can be employed to manage a number of different types of programs, including operating system modules, device drivers, client-resident network software, and the like.

The presently disclosed embodiments are therefore considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A software module stored in memory of a computer for managing an application program executed on the computer, comprising:

means for receiving an instruction to launch an application program on the computer and for determining whether multiple versions of the application program are stored in memory associated with the computer;

means for selecting one of the stored versions of the application program, pursuant to specified criteria; and means for generating a command to launch the selected version of the application program.

2. The software module of claim 1 wherein said command includes a reference which identifies the location where the selected version is stored in said memory associated with the computer.

3. The software module for claim 1 wherein said specified criteria designates that the newest stored version of the application program is to be launched in the absence of other factors.

4. The software module of claim 1 wherein said instruction to launch an application program is generated in response to the selection of a document, and said specified criteria designates that the version of the application program that was used to create the document is to be launched.

5. The software module of claim 1 further including means for recording data relating to the operation of a launched program, and for storing said data in a central location that is accessible to a plurality of computers.

6. The software module of claim 5 wherein the computer is a client computer on a computer network, and said central location is associated with a server computer on said network.

7. The software module of claim 6 further including means for determining whether a newer version of the application program is stored at said central location, and for automatically downloading the newer version from the central location to the memory associated with the computer.

8. The software module of claim 7 wherein said downloading is carried out after the application program is launched.

9. The software module of claim 8 wherein said downloading is carried out while the launched application program is running.

10. A method for automatically updating software programs on a computer, comprising the steps of:

storing an updated version of a program at a designated location in a memory that is accessible to the computer;

initiating the launching of a program that is stored in memory of the computer;

activating a software management module in response to said initiating step, and prior to actually launching the program, wherein said module carries out the steps of:
selecting and launching one version of the program that is stored in the memory of the computer;
detecting whether a version of the program is stored in the designated location; and
downloading to the computer the version that is stored at the designated location.

11. The method of claim 10 wherein said detecting and downloading steps are carried out as a background process by the module after the program has launched.

12. The method of claim 10 wherein said detecting and downloading steps are carried out by the module after the program has shut down.

13. The method of claim 10 wherein said downloading step is carried out by the module after the program has shut down.

14. A system for automatically updating software programs stored on a computer, comprising:

a first memory location that is accessible to the computer, for storing updated versions of software programs;

a second memory location for storing one or more versions of software programs to be executed on the computer; and a logic module stored in said second memory location, said logic module including means for launching a version of a software program stored in said second memory location, means for detecting whether an updated version of the launched program is stored in said first memory location, and means for downloading an updated version from said first memory location to said second memory location.

15. The system of claim 14 wherein said logic module further includes means for determining whether a version of the program stored at said first memory location is more recent than versions of the program stored in said second memory location, and for actuating said downloading means only if the version in said first memory location is more recent.

16. The system of claim 14 wherein said computer is a client on a computer network that includes a server computer, and wherein said first memory location is part of a memory associated with said server computer that is accessible to all client computers on the network, and said second memory location is a part of a local memory for the client computer.

17. A computer-readable storage medium having stored therein an application management program which executes the steps of:

selecting and launching one version from among plural versions of an application program;

detecting whether another version of the application program is present in a memory that is accessible to said management program;

determining whether a detected version of the application program is more recent than the launched version of the application program; and copying a more recent version of the program to memory of a computer on which said application management program is running.

18. The storage medium of claim 17 wherein said detecting, determining and copying steps are carried out as a background process by the management program after the application program has launched.

19. The storage medium of claim 17 wherein said detecting, determining and copying steps are carried out as part of a shut-down routine for the application program.

20. A software module stored in memory of a computer for monitoring an application program executed on the computer, comprising:

means for receiving an instruction to launch an application program on the computer;

means responsive to said instruction for generating a command to launch a version of the application program stored in memory associated with the computer;

means for recording data relating to the operation of the launched program; and means for uploading the recorded data to a central location that is accessible to a plurality of computers.

21. The software module of claim 20 wherein the computer is a client computer on a computer network, and said central location is associated with a server computer on said network.

22. The software module of claim 20, wherein said uploading is carried out after the application program is launched.

23. The software module of claim 22 wherein said uploading is carried out while the launched application program is running.

24. The software module of claim 20 further including means for determining whether a newer version of the application program is stored at said central location, and for automatically downloading the newer version from the central location to the memory associated with the computer.

25. The method of claim 10 wherein the software management module is stored in the memory of the computer.

* * * * *